(12) United States Patent
Kanai et al.

(10) Patent No.: US 12,370,697 B1
(45) Date of Patent: Jul. 29, 2025

(54) GRIPPING DEVICE AND CHUTE

(71) Applicant: K.K. SUN METALON, Yokohama (JP)

(72) Inventors: Yuji Kanai, Yokohama (JP); Kenichi Imai, Yokohama (JP); Daichi Suzuki, Yokohama (JP)

(73) Assignee: K.K. SUN METALON, Yokohama (JP)

( * ) Notice: Subject to any disclaimer, the term of this patent is extended or adjusted under 35 U.S.C. 154(b) by 0 days.

(21) Appl. No.: 19/074,143

(22) Filed: Mar. 7, 2025

(30) Foreign Application Priority Data

Dec. 19, 2024 (JP) ................................. 2024-224154

(51) Int. Cl.
*B25J 15/00* (2006.01)
(52) U.S. Cl.
CPC ....... *B25J 15/0033* (2013.01); *B25J 15/0095* (2013.01)
(58) Field of Classification Search
CPC .......................... B25J 15/0033; B25J 15/0095; B25J 15/0004; B25J 15/0057; B25J 15/0061
USPC .............................................. 294/119.1, 106
See application file for complete search history.

(56) References Cited

U.S. PATENT DOCUMENTS

| | | | | |
|---|---|---|---|---|
| 5,588,796 A * | 12/1996 | Ricco | ...................... | B25J 9/1679 |
| | | | | 414/753.1 |
| 6,860,531 B2 * | 3/2005 | Sherwin | ............... | B25J 15/0616 |
| | | | | 294/185 |
| 8,246,027 B2 * | 8/2012 | Li | ........................... | B25J 15/026 |
| | | | | 269/61 |
| 8,622,684 B2 * | 1/2014 | Bao | ........................ | B65G 47/88 |
| | | | | 414/781 |
| 8,625,131 B2 * | 1/2014 | Matsugashita | ........ | G06F 3/1288 |
| | | | | 358/1.9 |
| 10,005,191 B2 * | 6/2018 | Takikawa | .................. | B25J 15/12 |
| 10,850,405 B2 * | 12/2020 | Saito | ...................... | B25J 15/026 |
| 11,305,436 B2 * | 4/2022 | Tao | ...................... | B25J 15/0253 |
| 11,850,734 B2 * | 12/2023 | Liu | ...................... | B25J 15/0206 |
| 2009/0317221 A1 * | 12/2009 | Hawes | .................. | B25J 15/0253 |
| | | | | 414/814 |
| 2014/0175819 A1 * | 6/2014 | Wilson | ................... | B65G 47/90 |
| | | | | 294/198 |
| 2015/0028613 A1 | 1/2015 | Nakayama | | |
| 2025/0135661 A1 * | 5/2025 | Ochiishi | .................. | B25J 15/08 |

FOREIGN PATENT DOCUMENTS

| | | |
|---|---|---|
| JP | 5681271 B1 | 3/2015 |
| JP | 6883908 B1 | 6/2021 |
| JP | 7154463 B1 | 10/2022 |

\* cited by examiner

*Primary Examiner* — Paul T Chin
(74) *Attorney, Agent, or Firm* — Knobbe, Martens, Olson & Bear, LLP

(57) ABSTRACT

A gripping device may include a holder, a first contact member configured to be held by the holder, a second contact member configured to be held by the holder in a manner facing the first contact member, a contact member driver configured to move at least one of the first contact member and the second contact member to change a gap between the first contact member and the second contact member, a movable stage configured to be held by the holder in a manner capable of moving below the first contact member and the second contact member, and a movable stage drive mechanism configured to move the movable stage in a direction away from the holder.

7 Claims, 21 Drawing Sheets

Fig. 5A
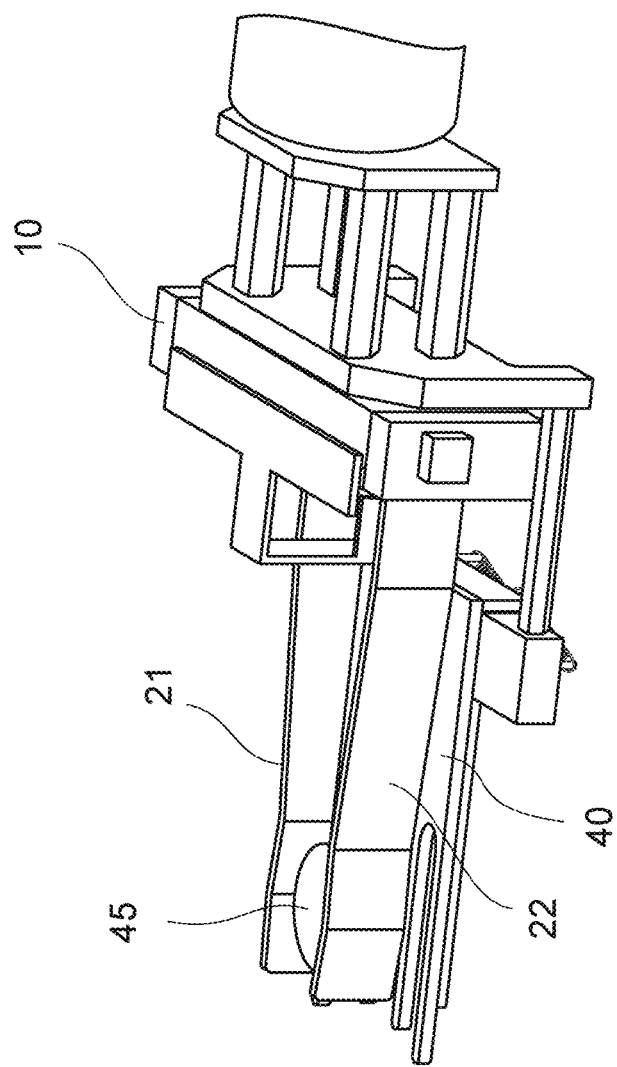
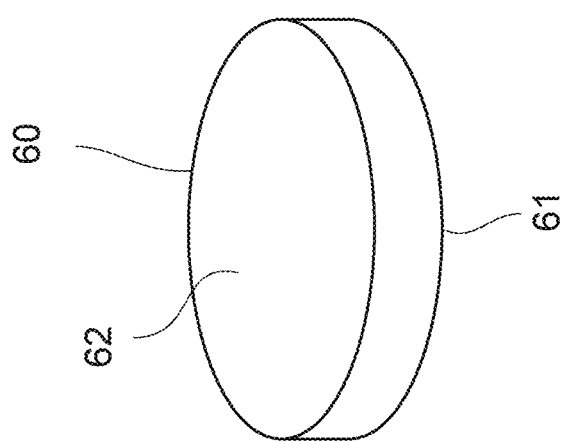

Fig. 6A
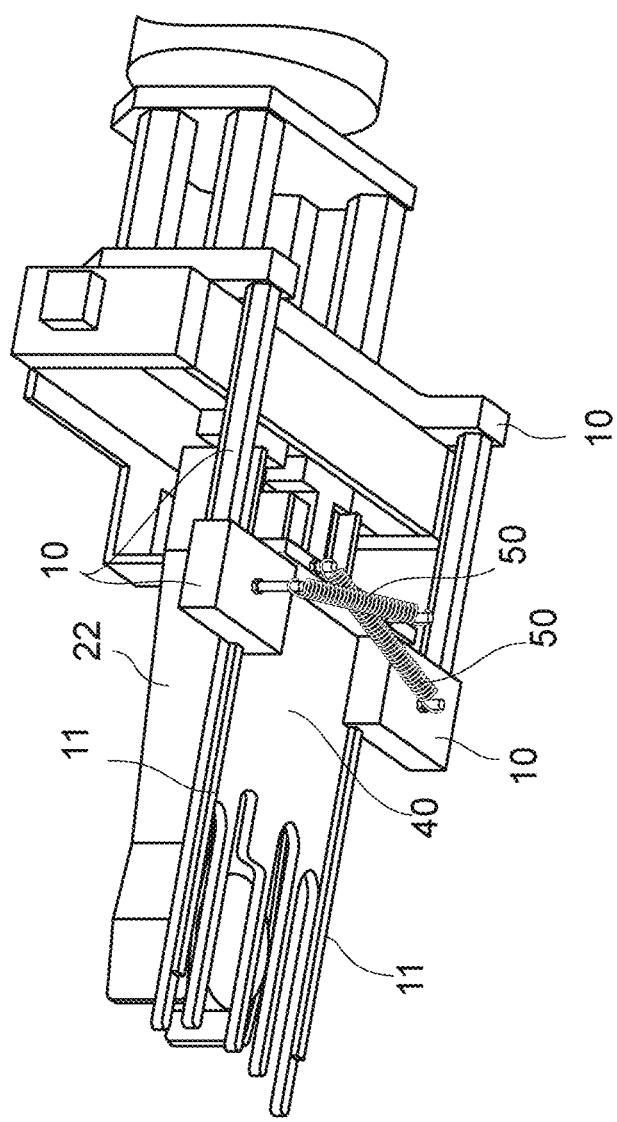
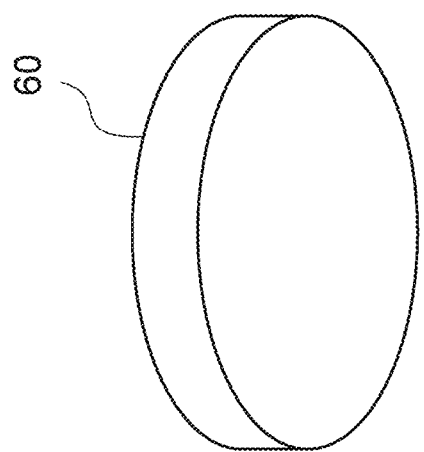

Fig. 7B
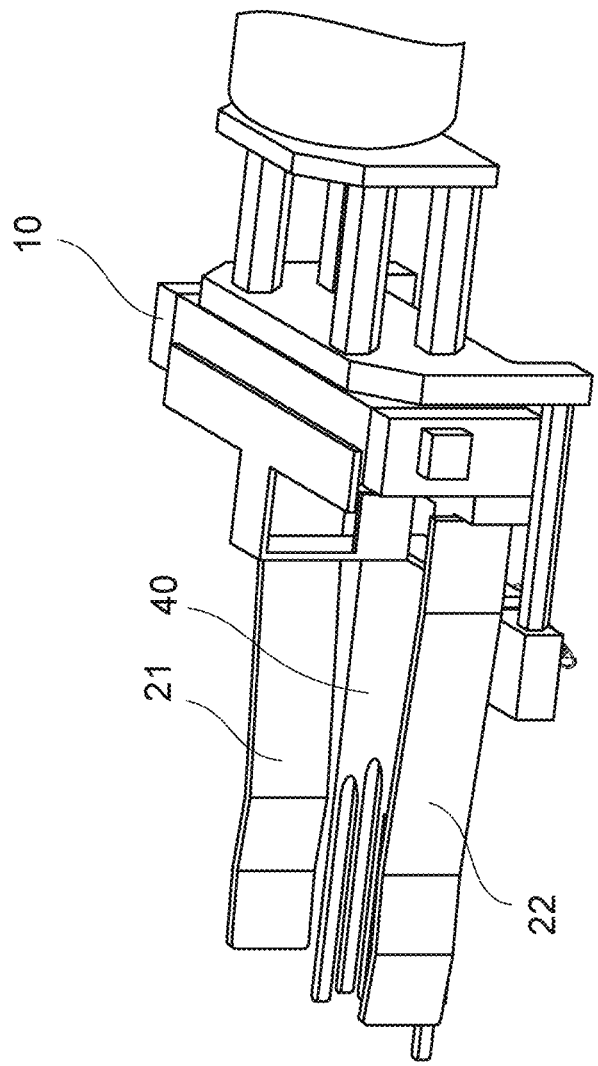
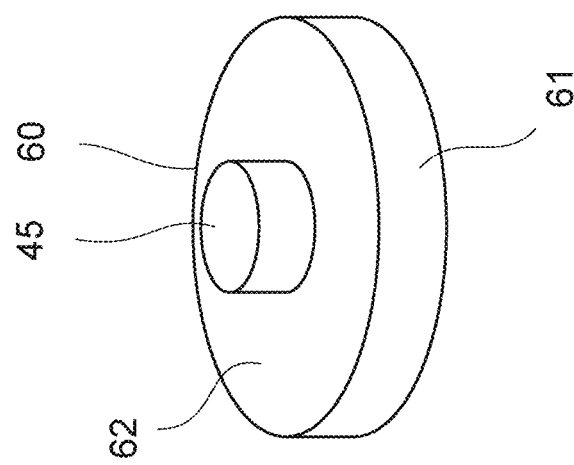

Fig. 8B
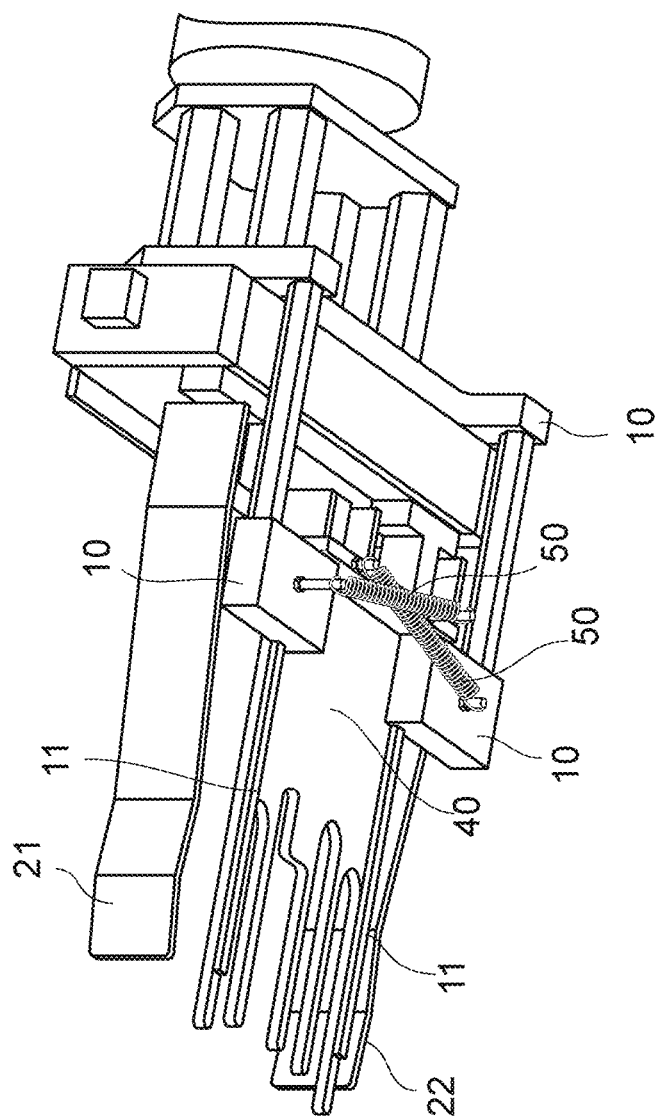
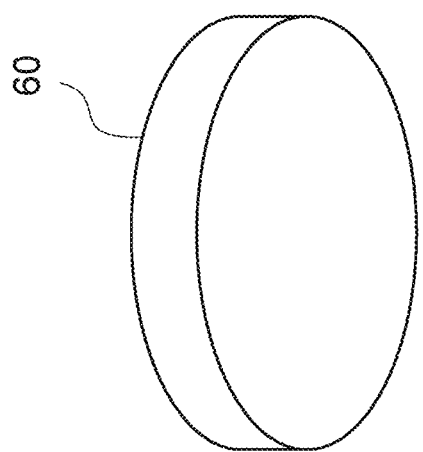

GRIPPING DEVICE AND CHUTE

BACKGROUND

Field

The present invention relates to a gripping device and a chute.

Description of the Related Art

In a factory or a distribution base, a robot hand is used to convey an object to be conveyed from an upstream process to a downstream process (see, for example, Japanese Patent No. 5681271, Japanese Patent No. 6883908, and Japanese Patent No. 7154463).

An object of the present invention is to provide a gripping device that is capable of easily placing an object to be conveyed on a conveyance destination stage.

SUMMARY OF THE INVENTION

A gripping device according to an embodiment of the present invention includes: a holder; a first contact member configured to be held by the holder; a second contact member configured to be held by the holder, the second contact member facing the first contact member; a contact member driver configured to move at least one of the first contact member and the second contact member to change a gap between the first contact member and the second contact member; a movable stage configured to be held by the holder, the movable stage being capable of moving below the first contact member and the second contact member; and a movable stage drive mechanism configured to move the movable stage in a direction away from the holder.

In relation to the gripping device described above, the movable stage may be configured to be slidable below the first contact member and the second contact member.

In relation to the gripping device described above, the movable stage drive mechanism may be configured to slide the movable stage in the direction away from the holder.

In relation to the gripping device described above, the movable stage drive mechanism may include an elastic body configured to connect the holder and the movable stage, and to store elastic energy when the movable stage moves toward the holder.

In relation to the gripping device described above, the holder may include a rail configured to movably hold the movable stage.

The gripping device described above may be connected to a movement device configured to cause a distal end of the movable stage to come into contact with a side surface of a conveyance destination stage, to cause the movable stage to move toward the holder, and to cause the first contact member and the second contact member to move to an upper surface of the conveyance destination stage.

In relation to the gripping device described above, the movable stage may include a protruding part.

The gripping device described above may be connected to a movement device configured to cause the protruding part of the movable stage to pass through a recessed part provided to a conveyance source stage.

In relation to the gripping device described above, the contact member driver may be configured to move at least one of the first contact member and the second contact member such that the first contact member and the second contact member sandwich an object to be conveyed with a specific force.

The gripping device described above may further include a load presence sensor configured to detect an object to be conveyed on the movable stage.

A conveying device according to an embodiment of the present invention includes (i) a gripping device including a holder, a first contact member configured to be held by the holder, a second contact member configured to be held by the holder in a manner facing the first contact member, a contact member driver configured to move at least one of the first contact member and the second contact member to change a gap between the first contact member and the second contact member, a movable stage configured to be held by the holder in a manner capable of moving below the first contact member and the second contact member, and a movable stage drive mechanism configured to move the movable stage in a direction away from the holder, and (ii) a movement device connected to the gripping device, the movement device being configured to cause a distal end of the movable stage of the gripping device to come into contact with a side surface of a conveyance destination stage, to cause the movable stage to move toward the holder, and to cause the first contact member and the second contact member to move to an upper surface of the conveyance destination stage.

In relation to the conveying device described above, the movable stage drive mechanism may include an elastic body configured to connect the holder and the movable stage, and to store elastic energy when the movable stage moves toward the holder.

In relation to the conveying device described above, the holder of the gripping device may include a rail configured to movably hold the movable stage.

In relation to the conveying device described above, the movable stage of the gripping device may include a protruding part.

In relation to the conveying device described above, the movement device may be configured to cause the protruding part of the movable stage of the gripping device to pass through a recessed part provided to a conveyance source stage.

In relation to the conveying device described above, the contact member driver may be configured to move at least one of the first contact member and the second contact member of the gripping device such that the first contact member and the second contact member sandwich an object to be conveyed with a specific force.

In relation to the conveying device described above, the gripping device may further include a load presence sensor configured to detect an object to be conveyed on the movable stage.

A chute according to the embodiment of the present invention includes a chute stage provided with a protruding part; and a stopper arranged at the protruding part of the chute stage.

The chute described above may further include a chute stage holder configured to hold the chute stage in such a way that a distal end of the protruding part of the chute stage is lower than a proximal end of the protruding part in a gravitational direction.

The chute described above may further include a first guard arranged on the chute stage, and a second guard arranged on the chute stage in a manner facing the first guard.

The chute described above may further include a guard driver configured to move at least one of the first guard and the second guard to change a gap between the first guard and the second guard.

A conveying system according to the embodiment of the present invention is a conveying system including:
(i) a gripping device including a holder, a first contact member configured to be held by the holder, a second contact member configured to be held by the holder in a manner facing the first contact member, a contact member driver configured to move at least one of the first contact member and the second contact member to change a gap between the first contact member and the second contact member, a movable stage configured to be held by the holder in a manner capable of moving below the first contact member and the second contact member, and a movable stage drive mechanism configured to move the movable stage in a direction away from the holder;
(ii) a movement device connected to the gripping device, the movement device being configured to cause a distal end of the movable stage of the gripping device to come into contact with a side surface of a conveyance destination stage, to cause the movable stage to move toward the holder, and to cause the first contact member and the second contact member to move to an upper surface of the conveyance destination stage; and
(iii) a chute including a chute stage, and a stopper arranged at a protruding part of the chute stage, where
a protruding part is provided at the movable stage,
a recessed part is provided at the chute stage, and
the protruding part of the movable stage is configured to passes through the recessed part of the chute stage.

According to the present invention, a gripping device that is capable of easily placing an object to be conveyed on a conveyance destination stage can be provided.

BRIEF DESCRIPTION OF THE DRAWINGS

FIG. 5A is a schematic perspective view showing the gripping device according to the embodiment from above;

FIG. 6A is a schematic bottom view showing the gripping device according to the embodiment from below;

FIG. 7B is a schematic perspective view showing the gripping device according to the embodiment from above;

FIG. 8B is a schematic bottom view showing the gripping device according to the embodiment from below;

DETAILED DESCRIPTION OF THE INVENTION

In the following, an embodiment of the present invention will be described with reference to the drawings. However, the drawings are schematic. Accordingly, specific dimensions and the like should be determined in view of the description below. Furthermore, it is needless to say that dimensional relationship and proportion may differ among the drawings.

Figure 1:
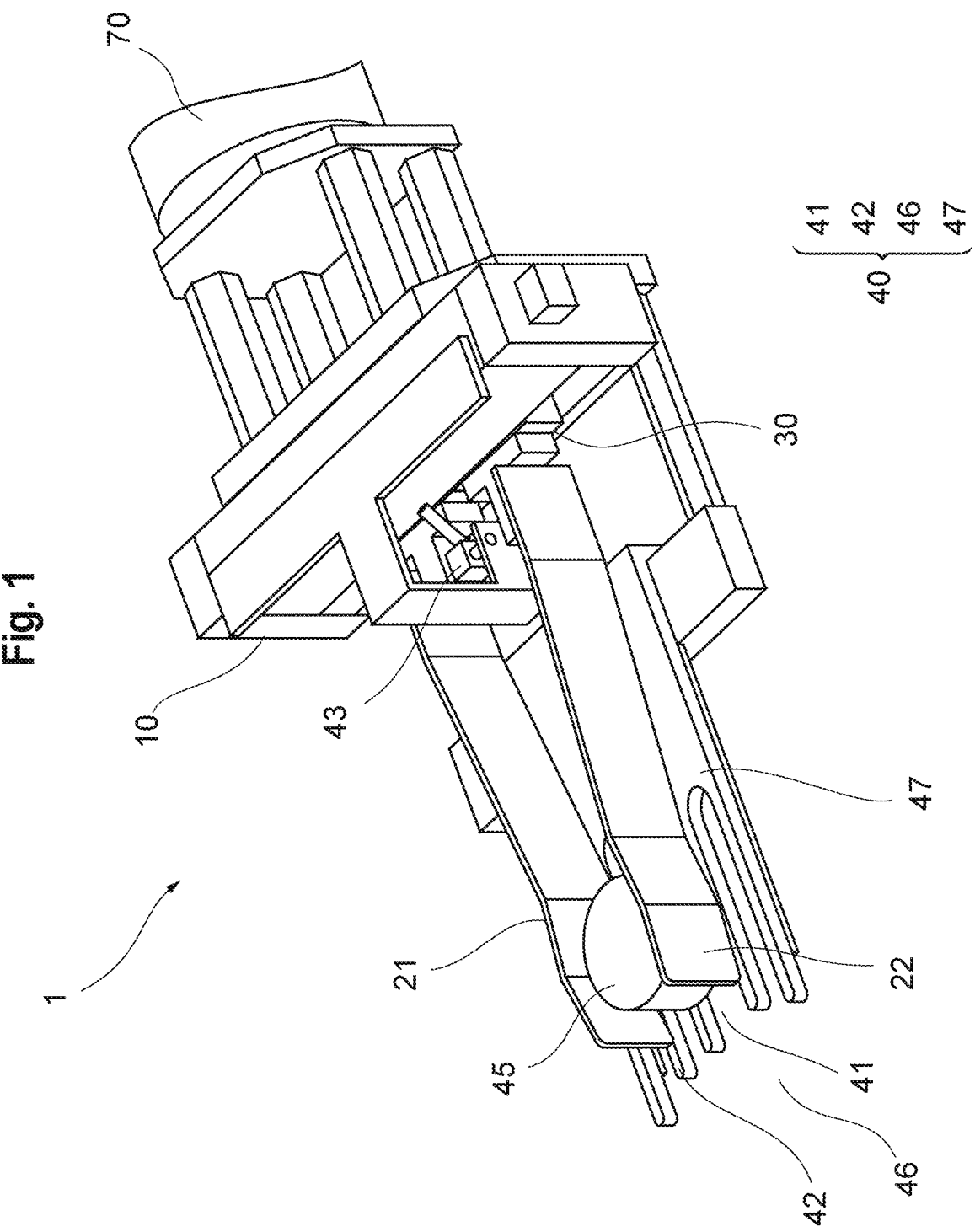
FIG. 1 is a schematic perspective view showing a gripping device according to an embodiment from above.
Figure 2:
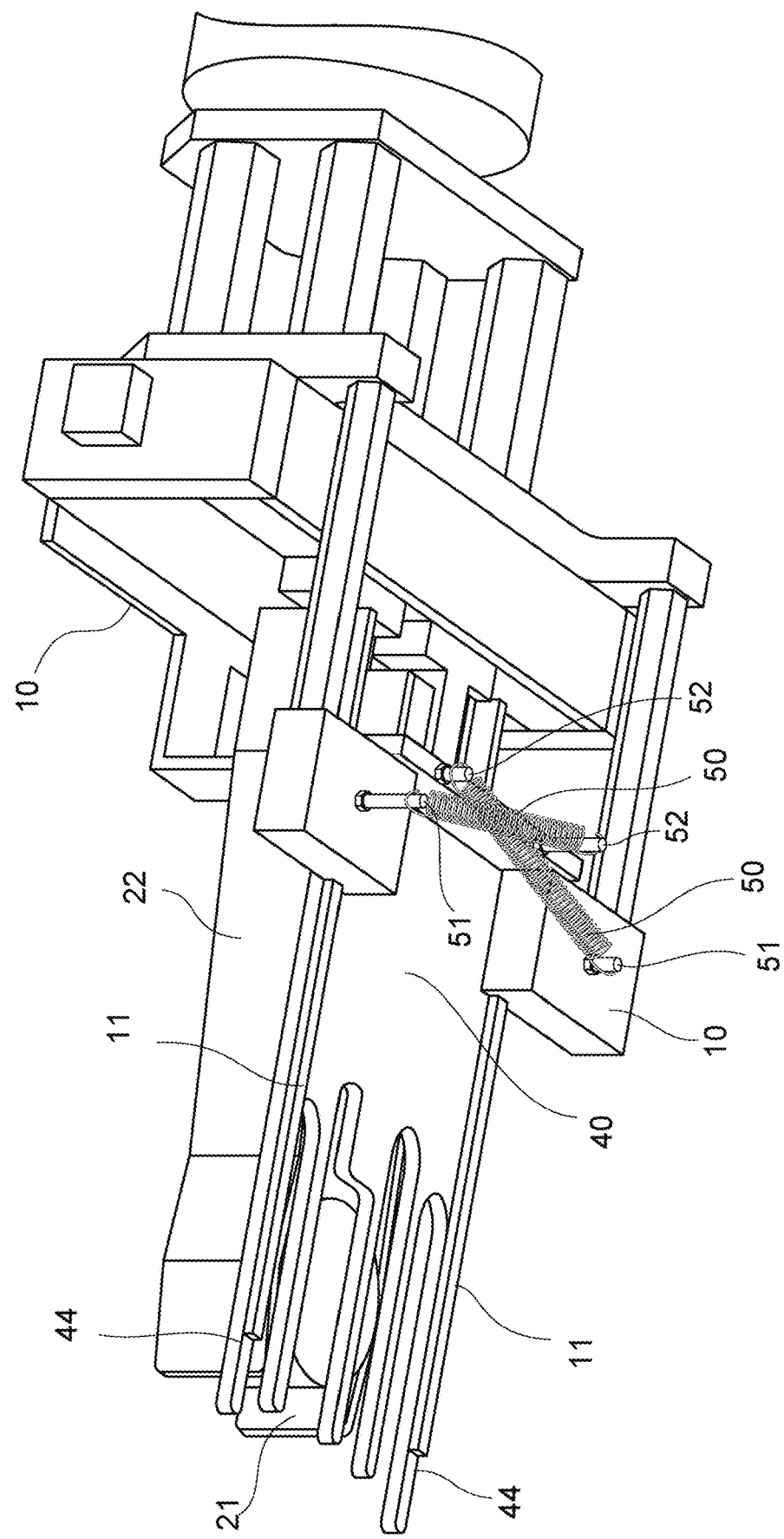
FIG. 2 is a schematic perspective view showing the gripping device according to the embodiment from below.

As shown in FIGS. 1 and 2, a gripping device 1 according to the embodiment includes a holder 10, a first contact member 21 configured to be held by the holder 10, a second contact member 22 configured to be held by the holder 10 in a manner facing the first contact member 21, a contact member driver 30 configured to move at least one of the first contact member 21 and the second contact member 22 to change a gap between the first contact member 21 and the second contact member 22, a movable stage 40 configured to be held by the holder 10 in a manner capable of moving below the first contact member 21 and the second contact member 22, and a movable stage drive mechanism 50 configured to move the movable stage 40 in a direction away from the holder 10. The gripping device is referred to also as a robot hand or an end effector.

An object to be conveyed 45 is placed on the movable stage 40. In the present disclosure, of two end portions of the movable stage 40 that face each other, one that is close to the holder 10 will be referred to as a proximal end, and one that is away from the holder 10 will be referred to as a distal end. Furthermore, a direction perpendicular to a direction connecting the proximal end and the distal end of the movable stage 40 will be referred to as a width direction. The movable stage 40 may take any shape, but is plate-shaped, for example. Recessed portions 41 and protruding portions 42 may be provided on the distal end of the movable stage 40. The protruding portions 42 protrude from a base portion 47 of the movable stage 40 toward the distal end. The recessed portions 41 may be cutout parts. The recessed portions 41 and the protruding portions 42 of the movable stage 40 may form a comb-shaped portion 46. At the comb-shaped portion 46 of the movable stage 40, a gap between a plurality of tooth portions (protruding parts) 42 is set smaller than a size of the object to be conveyed 45. The gap between a plurality of tooth portions (protruding parts) 42 may be a space between adjacent protruding portions 42. Furthermore, the gap between a plurality of tooth portions (protruding parts) 42 may be the recessed part 41. Materials of the movable stage 40 are not particularly limited, and may be metal and resin, for example.

The gripping device 1 according to the embodiment may further include a load presence sensor 43 configured to detect the object to be conveyed 45 on the movable stage 40. For example, the load presence sensor 43 detects presence/absence of the object to be conveyed 45 on the movable stage 40 based on a load applied to the movable stage 40. Alternatively, the load presence sensor 43 may detect presence/absence of the object to be conveyed 45 on the movable stage 40 in a contactless manner by using light, radio wave, or acoustic wave. The load presence sensor 43 is held by the holder 10, for example.

Figure 3:
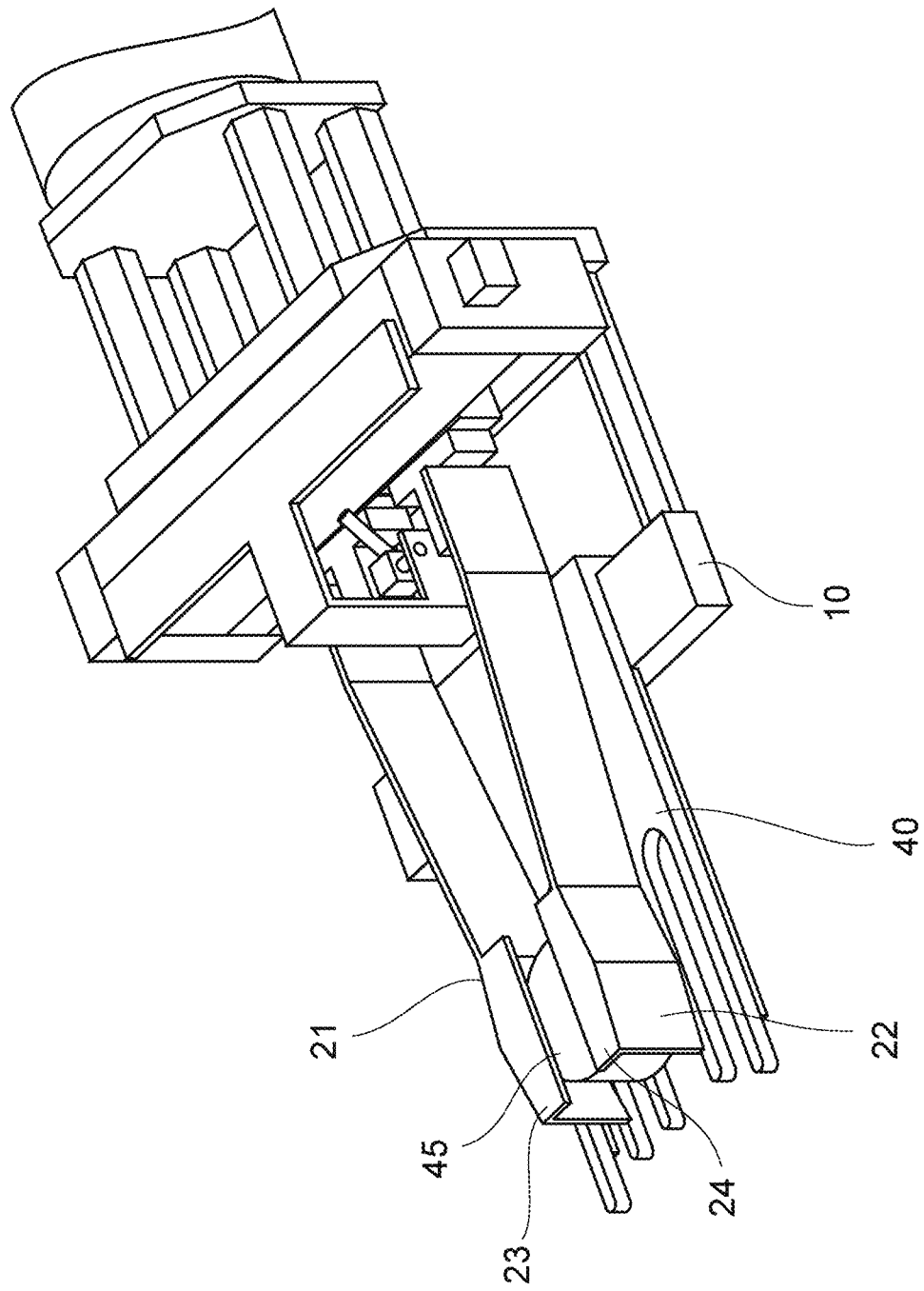
FIG. 3 is a schematic perspective view showing the gripping device according to the embodiment from above.

The first contact member 21 and the second contact member 22 each include a side surface that is perpendicular to an upper surface of the movable stage 40, for example. However, the side surface may be inclined or may include a curved surface. The first contact member 21 and the second contact member 22 are not particularly limited in terms of shape, and may be plate-shaped or rod-shaped, for example. The first contact member 21 and the second contact member 22 may each include a bent portion. Materials of the first contact member 21 and the second contact member 22 are not particularly limited, and may be metal and resin, for example. As shown in FIG. 3, the first contact member 21 and the second contact member 22 may include covers 23, 24 for at least partially covering an upper surface of the object to be conveyed 45, respectively.

In the present disclosure, of two end portions that face each other of each of the first contact member 21 and the second contact member 22, one that is close to the holder 10 will be referred to as a proximal end, and one that is away from the holder 10 will be referred to as a distal end. For example, the first contact member 21 and the second contact member 22 are each movably held by the holder 10 at the proximal end. The gripping device 1 according to the embodiment sandwiches the object to be conveyed 45 between the first contact member 21 and the second contact member 22 by narrowing the gap between the first contact member 21 and the second contact member 22 by the contact member driver 30, and holds the object to be conveyed 45 on the movable stage 40. The contact member driver 30 may be configured such that the first contact member 21 and the second contact member 22 sandwich the object to be conveyed 45 with a specific force.

The contact member driver 30 may narrow the gap between the first contact member 21 and the second contact member 22 by moving the first contact member 21 toward the second contact member 22 without moving the second contact member 22. The contact member driver 30 may narrow the gap between the first contact member 21 and the second contact member 22 by moving the second contact member 22 toward the first contact member 21 without moving the first contact member 21. The contact member driver 30 may narrow the gap between the first contact member 21 and the second contact member 22 by moving the first contact member 21 toward the second contact member 22 and moving the second contact member 22 toward the first contact member 21.

When narrowing the gap between the first contact member 21 and the second contact member 22, the contact member driver 30 may narrow the gap between the first contact member 21 and the second contact member 22 at a first speed, and then narrow the gap between the first contact member 21 and the second contact member 22 at a second speed slower than the first speed. This can prevent application of a strong force to the object to be conveyed 45 that is sandwiched between the first contact member 21 and the second contact member 22.

In the case where at least one of the first contact member 21 and the second contact member 22 moves while the object to be conveyed 45 is sandwiched between the first contact member 21 and the second contact member 22, the contact member driver 30 may issue a signal indicating occurrence of an abnormality to outside. For example, when the object to be conveyed 45 crumbles while being conveyed, the first contact member 21 and the second contact member 22 may move closer to each other.

Figure 4A:
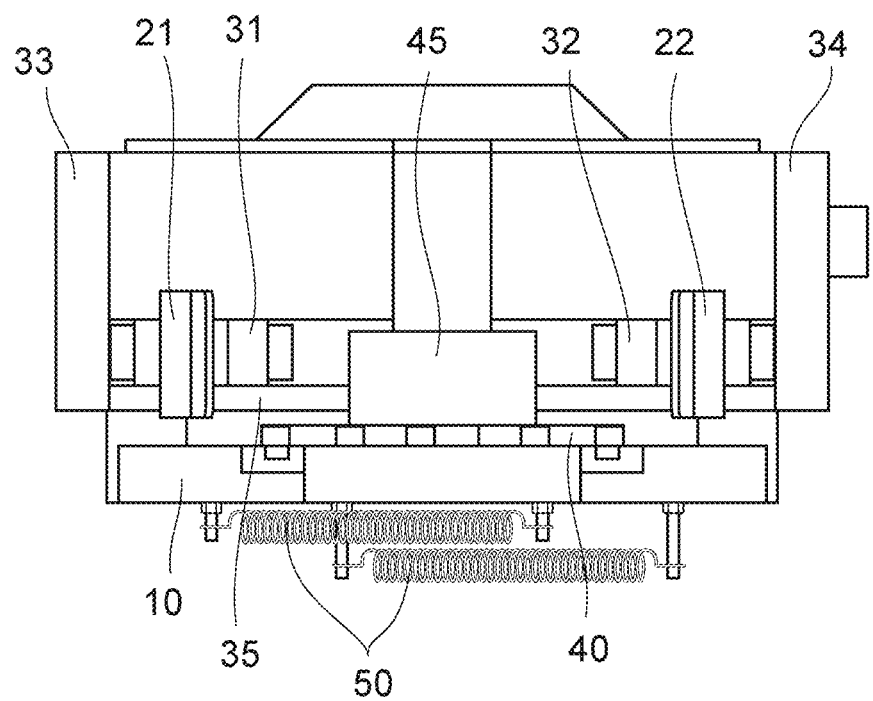
FIG. 4A is a schematic front view showing the gripping device according to the embodiment from front.
Figure 4B:
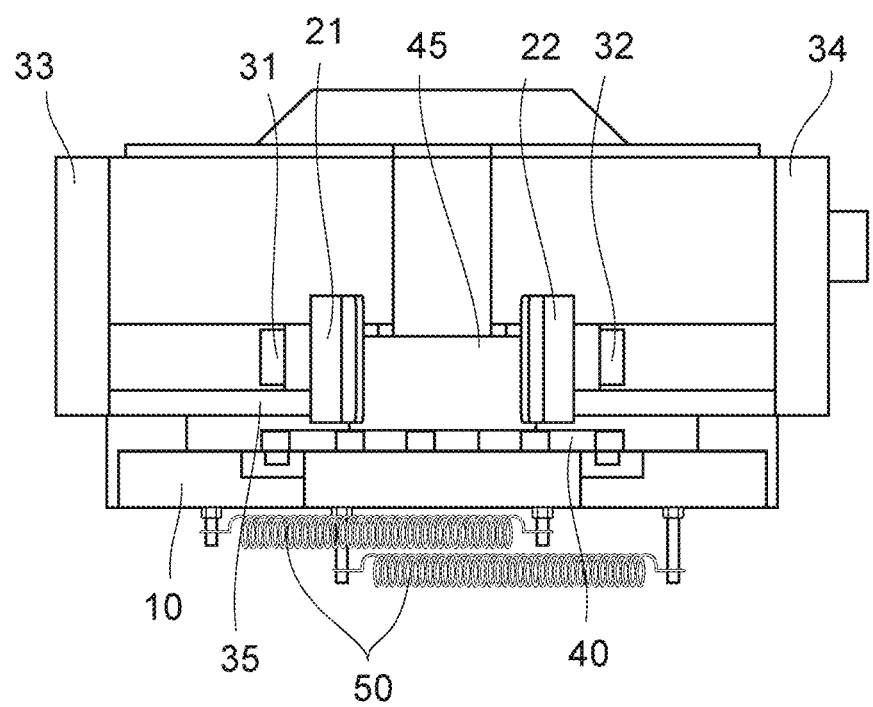
FIG. 4B is a schematic front view showing the gripping device according to the embodiment from front.
Figure 5B:
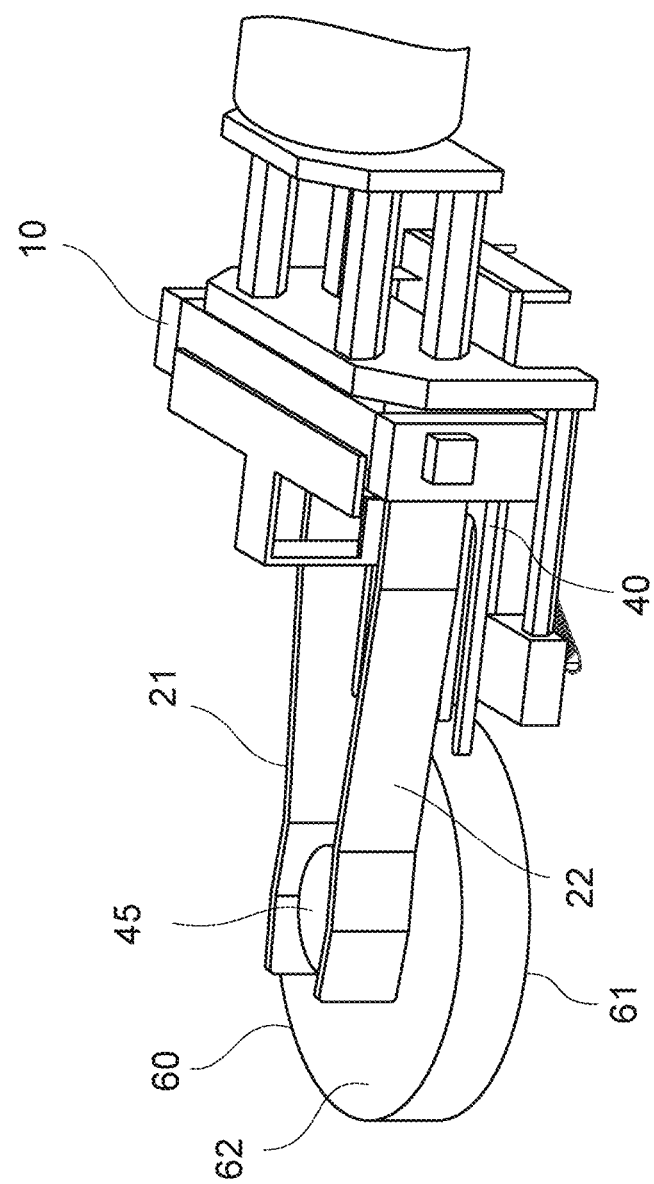
FIG. 5B is a schematic perspective view showing the gripping device according to the embodiment from above.
Figure 6B:
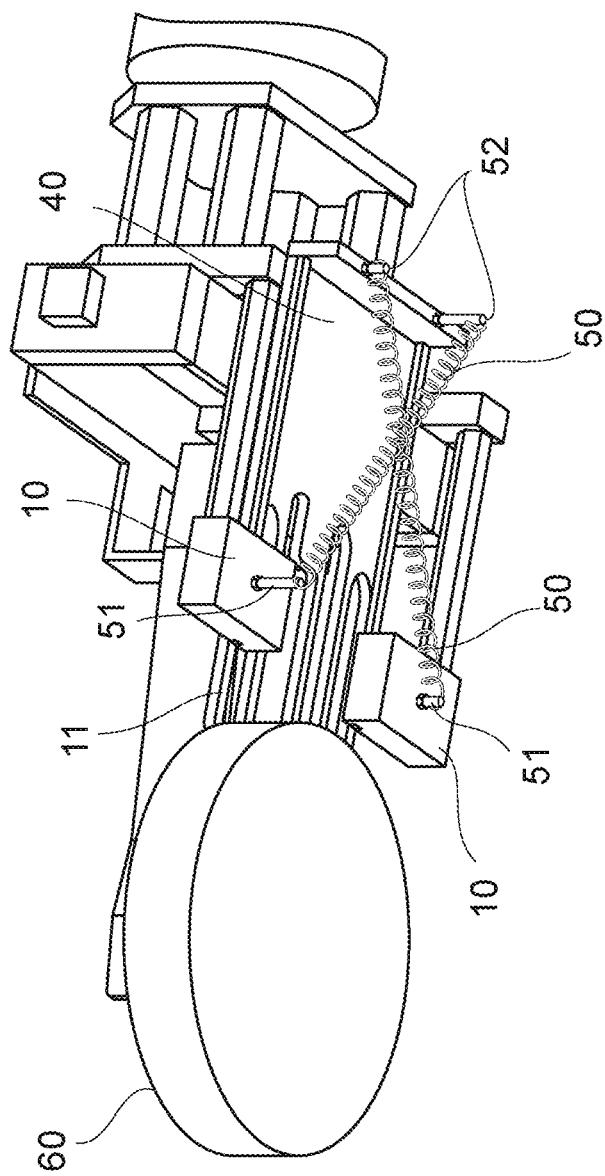
FIG. 6B is a schematic bottom view showing the gripping device according to the embodiment from below.
Figure 7A:
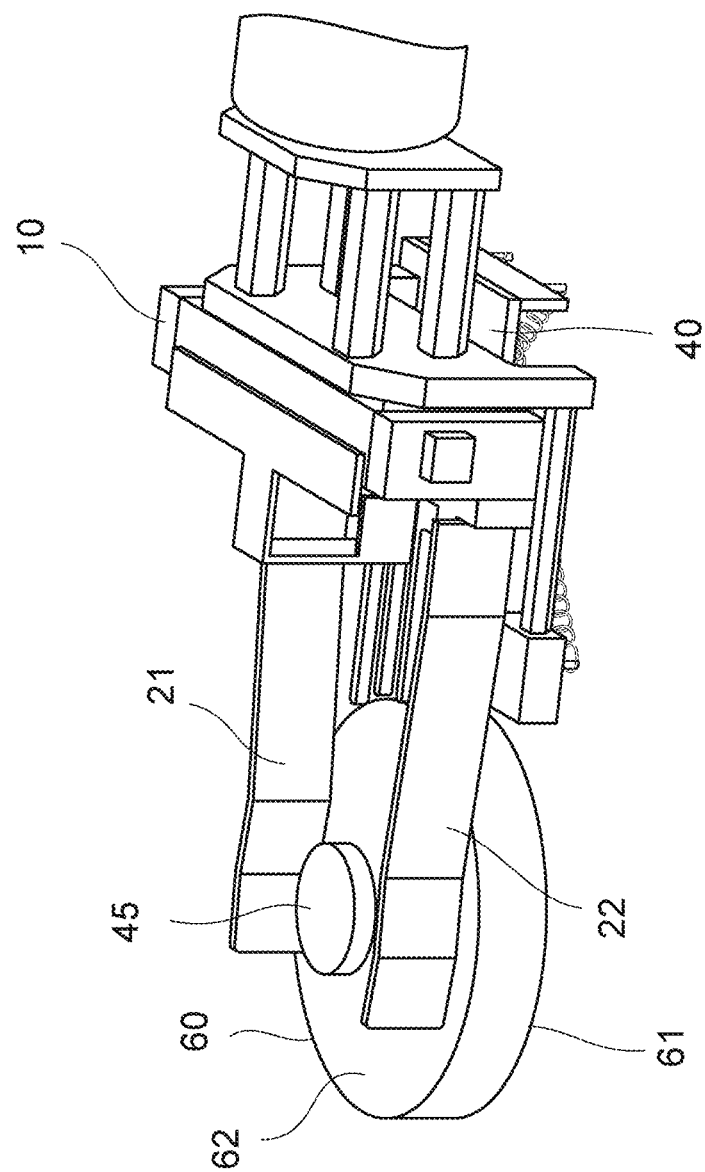
FIG. 7A is a schematic perspective view showing the gripping device according to the embodiment from above.
Figure 8A:
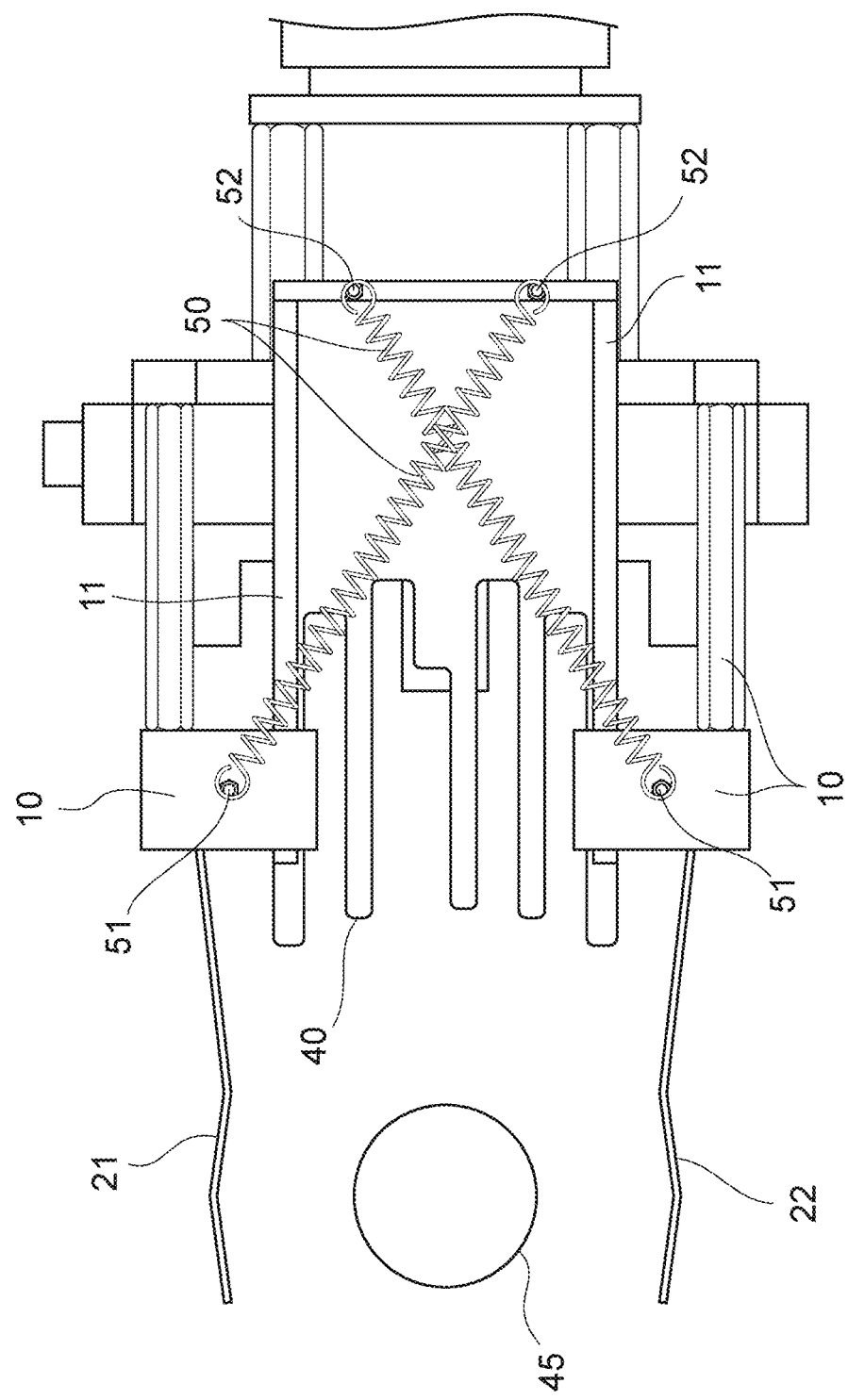
FIG. 8A is a schematic bottom view showing the gripping device according to the embodiment from below.

The contact member driver 30 is held by the holder 10, for example. The contact member driver 30 includes an actuator, for example. The actuator may be an electric motor, a hydraulic cylinder, a hydraulic motor, a pneumatic cylinder, or a pneumatic motor, for example. As shown in FIGS. 4A and 4B, the contact member driver 30 includes a first contact member holder 31 for holding the first contact member 21, a second contact member holder 32 for holding the second contact member 22, and actuators 33, 34 for moving the first contact member holder 31 and the second contact member holder 32 in the width direction of the movable stage 40, for example. The actuators 33, 34 and the first and second contact member holders 31, 32 are connected by ball screws, for example. The first contact member holder 31 and the second contact member holder 32 move along rails 11, for example. The actuators 33, 34 may move the first contact member holder 31 and the second contact member holder 32 left-right symmetrically in the width direction of the movable stage 40.

As shown in FIG. 2, the holder 10 includes the rails 11 configured to movably hold the movable stage 40, for example. A fitting section 44 for fitting with the rail 11 is connected to the movable stage 40, for example. The movable stage 40 is movable along the rail 11. The fitting section 44 may be connected to a lower surface, a side surface, or an upper surface of the movable stage 40. In the case where the fitting section 44 is connected to the lower surface of the movable stage 40, the movable stage 40 is held by the rail 11 from below. In the case where the fitting section 44 is connected to the side surface of the movable stage 40, the movable stage 40 is held by the rail 11 from the side. In the case where the fitting section 44 is connected to the upper surface of the movable stage 40, the movable stage 40 is held by the rail 11 from above.

The movable stage drive mechanism 50 includes an elastic body configured to connect the holder 10 and the movable stage 40, and to store elastic energy when the movable stage 40 moves toward the holder 10, for example. The elastic body is a spring, for example. The spring may be a metallic spring or a non-metallic spring, for example. The non-metallic spring may be a polymer spring or a fluid spring, for example. The fluid spring may be an air spring, for example. The gripping device 1 according to the embodiment may include a plurality of elastic bodies. A first end portion 51 of the elastic body is connected to the holder 10, and a second end portion 52 of the elastic body is connected to the movable stage 40.

For example, as shown in FIGS. 5A, 5B, 6A, and 6B, the gripping device 1 according to the embodiment is connected to a movement device 70 configured to cause the distal end of the movable stage 40 to come into contact with a side surface 61 of a conveyance destination stage 60, to cause the movable stage 40 to move toward the holder 10, and to cause the first contact member 21 and the second contact member 22 to move to an upper surface 62 of the conveyance destination stage 60. The movement device 70 is capable of moving in three-dimensional directions, and is capable of moving the gripping device 1 to any location. The movement device 70 may include a robot arm and a manipulator. The movement device 70 may include an arm of a vertical robot, an arm of a SCARA robot, an arm of a parallel link robot, and an arm of an orthogonal robot. The gripping device 1 and the movement device 70 may form a conveying device. The conveying device may be a robot.

The movement device 70 causes the gripping device 1 gripping the object to be conveyed 45 to move close to the conveyance destination stage 60. The movement device 70 causes the distal end of the movable stage 40 of the gripping device 1 to come into contact with the side surface 61 of the conveyance destination stage 60 while causing bottom portions of the first contact member 21 and the second contact member 22 to be at a same height as the upper surface 62 of the conveyance destination stage 60 or higher than the upper surface 62 of the conveyance destination stage 60. When the movement device 70 causes the gripping device 1 to move even closer to the conveyance destination stage 60, the movable stage 40 moves toward the holder 10. The distal ends of the first contact member 21 and the second contact member 22 gripping the object to be conveyed 45 thus protrude from the movable stage 40 toward the conveyance destination stage 60. Furthermore, due to movement of the movable stage 40 toward the holder 10, the elastic body is elongated and stores elastic energy.

As shown in FIGS. 7A, 7B, 8A, and 8B, the contact member driver 30 increases the gap between the first contact member 21 and the second contact member 22 in a state where the distal ends of the first contact member 21 and the second contact member 22 gripping the object to be conveyed 45 are on the upper surface 62 of the conveyance destination stage 60. The object to be conveyed 45 is thereby placed on the upper surface 62 of the conveyance destination stage 60. After the gap between the first contact member 21 and the second contact member 22 is increased by the contact member driver 30, the movement device 70 causes the gripping device 1 to retract from the conveyance destination stage 60. When the distal end of the movable stage 40 is no longer in contact with the side surface 61 of the conveyance destination stage 60, a length of the elastic body returns to a length before the elastic energy is stored, and the movable stage 40 moves in an opposite direction from the holder 10 by the elastic energy stored by the elastic body such that the distal end of the movable stage 40 moves toward the distal ends of the first contact member 21 and the second contact member 22.

The movement device 70 may move the gripping device 1 based on coordinate information of the conveyance destination stage 60 that is acquired in advance. Alternatively, the gripping device 1 may include a sensor for detecting the conveyance destination stage 60, and the movement device 70 may move the gripping device 1 based on a detection signal from the sensor.

As shown in FIGS. 6A, 6B, 8A, and 8B, the elastic body may be connected to the holder 10 and the movable stage 40 while being inclined relative to a movement direction of the movable stage 40. When the elastic body is arranged inclined relative to the movement direction of the movable stage 40, the elastic body can be made longer compared to a case where the elastic body is arranged in parallel with the movement direction of the movable stage 40. Accordingly, the amount of elastic energy to be stored in the elastic body can be increased. For example, in the case where the gripping device 1 includes two elastic bodies, the two elastic bodies can be arranged to intersect each other.

Additionally, in FIGS. 5A, 5B, 6A, and 6B, an example is shown where the movable stage 40 is moved toward the holder 10 and the elastic body is elongated to store elastic energy, but the elastic body may instead be connected to the movable stage 40 and the holder 10 in such a manner that when the movable stage 40 moves toward the holder 10, the elastic body contracts to store elastic energy. If a connection part between the elastic body and the movable stage 40 is closer to the proximal end of the movable stage 40 than a connection part between the elastic body and the holder 10 in a state where elastic energy is not stored in the elastic body, the elastic body is elongated when the movable stage 40 moves toward the holder 10. If the connection part between the elastic body and the movable stage 40 is closer to the distal end of the movable stage 40 than the connection part between the elastic body and the holder 10 in a state where elastic energy is not stored in the elastic body, the elastic body contracts when the movable stage 40 moves toward the holder 10.

The conveyance destination stage 60 is not particularly limited in terms of shape as long as a side surface is included, and may have a columnar shape or a rectangular columnar shape. The conveyance destination stage 60 may be rotatable. The conveyance destination stage 60 may be provided in a furnace.

The object to be conveyed 45 is not particularly limited, and may be an industrial material, an industrial product, a food material, or food, for example. The object to be conveyed 45 is referred to also as a workpiece. The object to be conveyed 45 is not particularly limited in terms of shape, and may have a disk shape, a columnar shape, or a rectangular columnar shape, for example. The object to be conveyed 45 is not particularly limited in terms of hardness, and may be hard, or may be fragile as long as the object to be conveyed 45 can be grasped between the first contact member 21 and the second contact member 22. A material of the object to be conveyed 45 is not particularly limited, and may be metal, non-metallic inorganic substance, or an organic substance. The object to be conveyed 45 may be a metal briquette obtained by compressing a metal material. The material of the object to be conveyed 45 may include a simple metal or a metal compound such as an alloy. Examples of metal include iron (Fe), nickel (Ni), copper (Cu), gold (Au), silver (Ag), aluminum (Al), and cobalt (Co).

The material of the object to be conveyed 45 may include one type of metal, or a plurality of types of metal. Examples of metal compound include, but are not limited to, an alloy composed of a plurality of metal elements, an alloy composed of a metal element and a non-metal element, an oxide of metal, a hydroxide of metal, a chloride of metal, a carbide of metal, a boride of metal, and a sulfide of metal. Metal powder may include, as alloy components, silicon (Si), manganese (Mn), chromium (Cr), nickel (Ni), carbon (C), boron (B), copper (Cu), aluminum (Al), titanium (Ti), niobium (Nb), vanadium (V), zinc (Zn), sulfur(S), and the like, for example.

The object to be conveyed 45 may include impurities. In the case where the object to be conveyed 45 is a metal briquette, the object to be conveyed 45 may include impurities such as oil and lubricant.

Figure 9A:
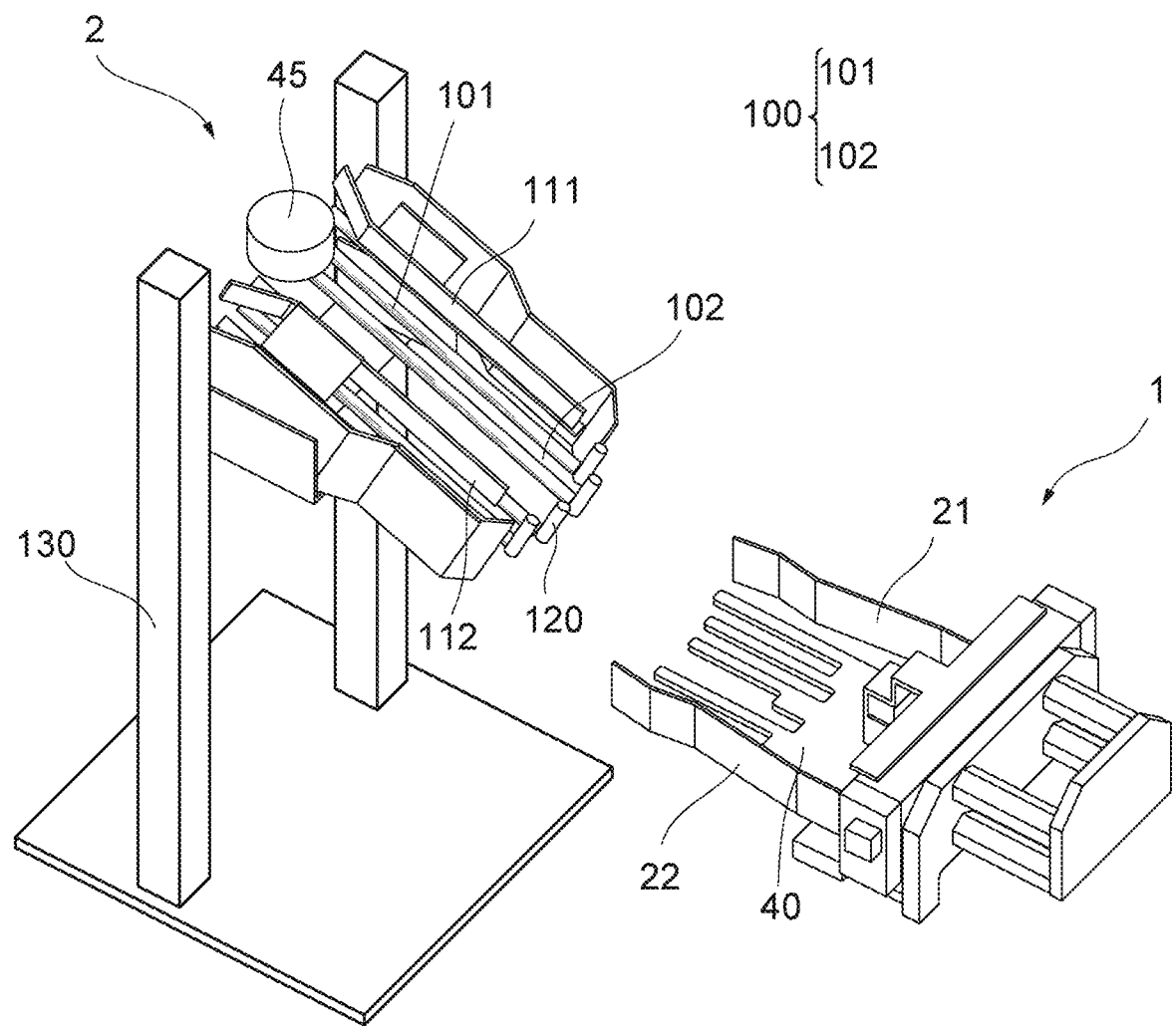
FIG. 9A is a schematic perspective view showing a chute and the gripping device according to the embodiment from above.

For example, as shown in FIG. 9A, the gripping device 1 receives the object to be conveyed 45 from a chute 2. The chute 2 according to the embodiment includes a chute stage 100 provided with recessed portions 102 and protruding portions 101, and stoppers 120 provided at the protruding portions 101 of the chute stage 100. The chute 2 may further include a first guard 111 arranged on the chute stage 100, and a second guard 112 arranged on the chute stage 100 in a manner facing the first guard 111. In the present disclosure, the chute stage may be referred to also as a conveyance source stage. Furthermore, the chute 2 further includes a chute stage holder 130 configured to hold the chute stage 100 in such a way that a distal end of the protruding part 101 of the chute stage 100 is lower than a proximal end of the protruding part 101 in a gravitational direction.

Figure 9B:
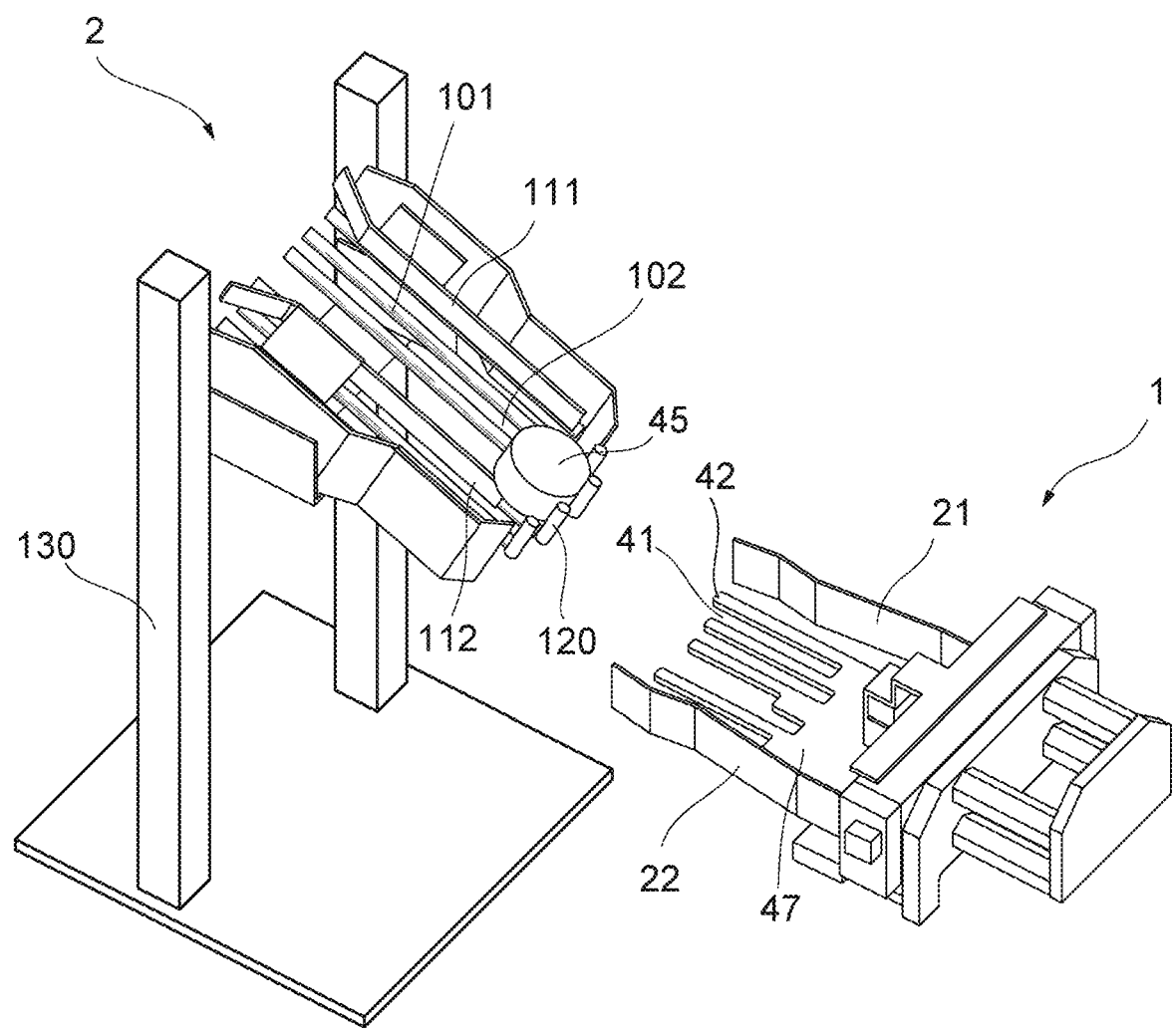
FIG. 9B is a schematic perspective view showing the chute and the gripping device according to the embodiment from above.

For example, the chute 2 is disposed at a conveyance outlet of a processing device for the object to be conveyed 45. The processing device is a briquette machine, for example. The recessed portions 102 and the protruding portions 101 of the chute stage 100 may form a comb-shaped portion. As shown in FIG. 9B, the object to be conveyed 45 discharged onto the chute stage 100 of the chute 2 from the conveyance outlet of the processing device slides down the chute stage 100 that is inclined relative to the gravitational direction, reaches the stoppers 120 disposed at the distal ends of the protruding portions 101 of the chute stage 100, and is held at the protruding portions 101 of the chute stage 100 thanks to the stoppers 120. A gap between adjacent protruding portions 101 of the chute stage 100 of the chute 2 is smaller than a width of the object to be conveyed 45. Accordingly, the object to be conveyed 45 does not fall through the recessed portion 102 of the chute stage 100. Furthermore, the first guard 111 and the second guard 112 of the chute 2 prevent the object to be conveyed 45 from falling from sides of the chute stage 100.

Figure 10A:
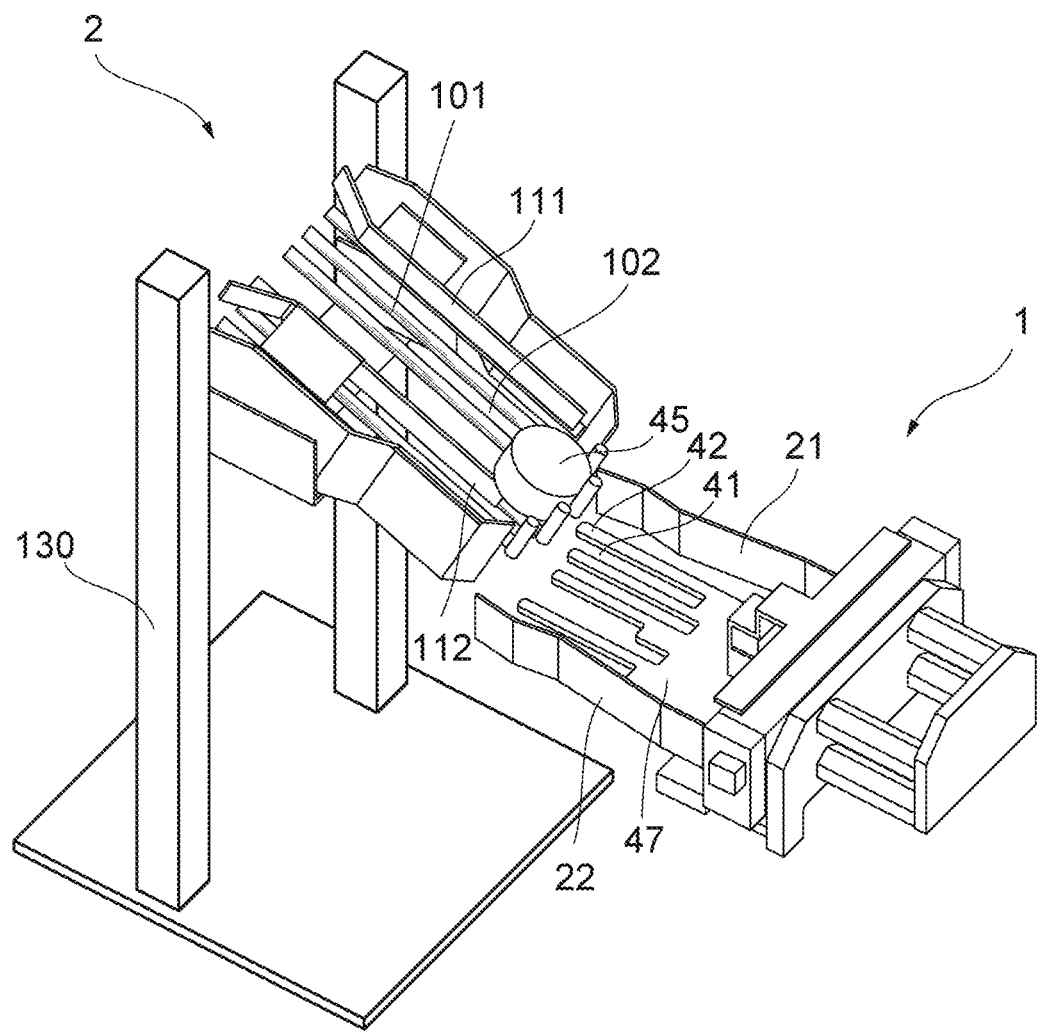
FIG. 10A is a schematic perspective view showing the chute and the gripping device according to the embodiment from above.
Figure 10B:
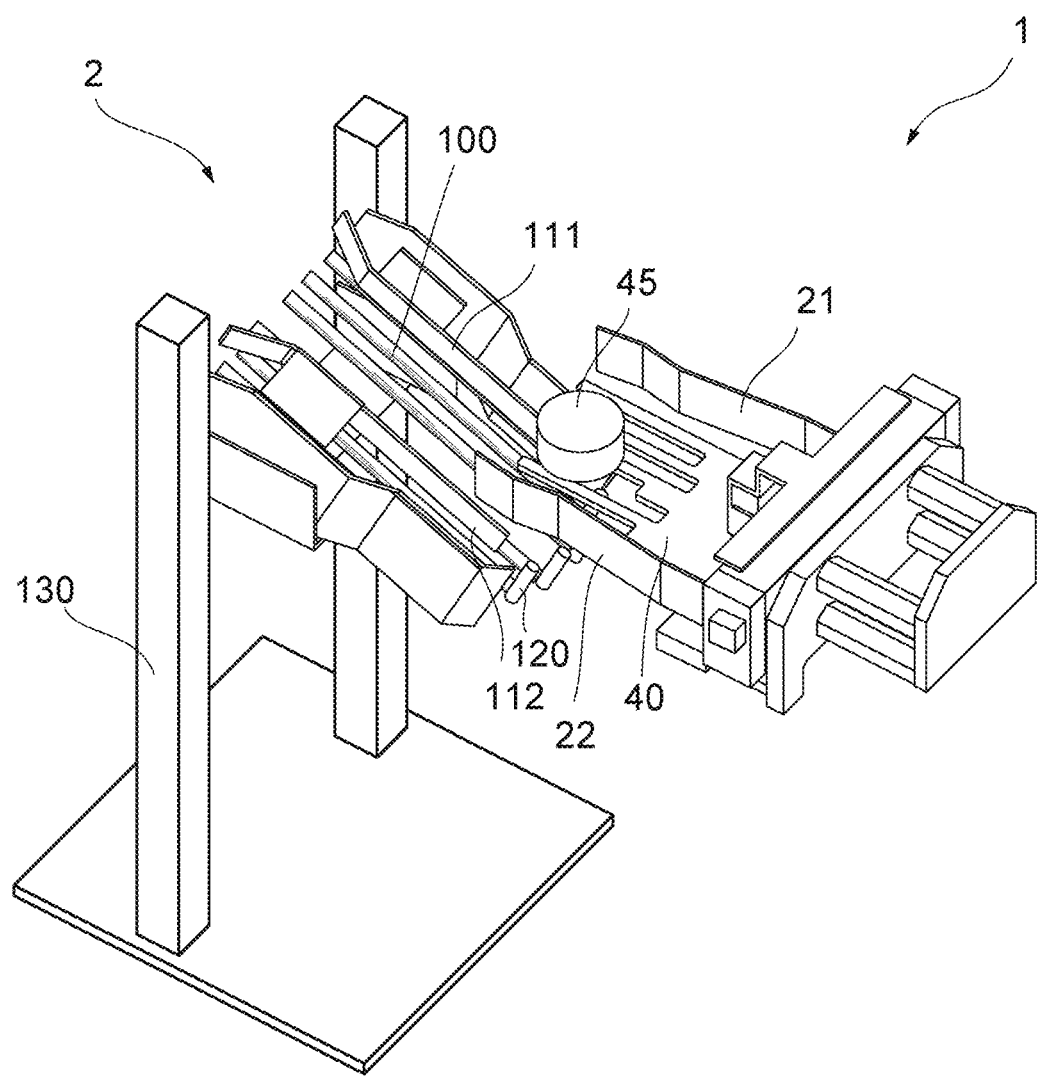
FIG. 10B is a schematic perspective view showing the chute and the gripping device according to the embodiment from above.

A width of the recessed portion 102 of the chute stage 100 of the chute 2 is greater than a width of the protruding part 42 of the movable stage 40 of the gripping device 1. Furthermore, a width on at least a distal end side of the chute stage 100 is smaller than a gap between the first contact member 21 and the second contact member 22 of the gripping device 1 when the first contact member 21 and the second contact member 22 are open. As shown in FIGS. 10A and 10B, the movement device 70 shown in FIG. 1 causes the protruding part 42 of the movable stage 40 of the gripping device 1 to pass through the recessed portion 102 of the chute stage 100 of the chute 2 from below, and thereby places the object to be conveyed 45 on the movable stage 40 of the gripping device 1.

Figure 11A:
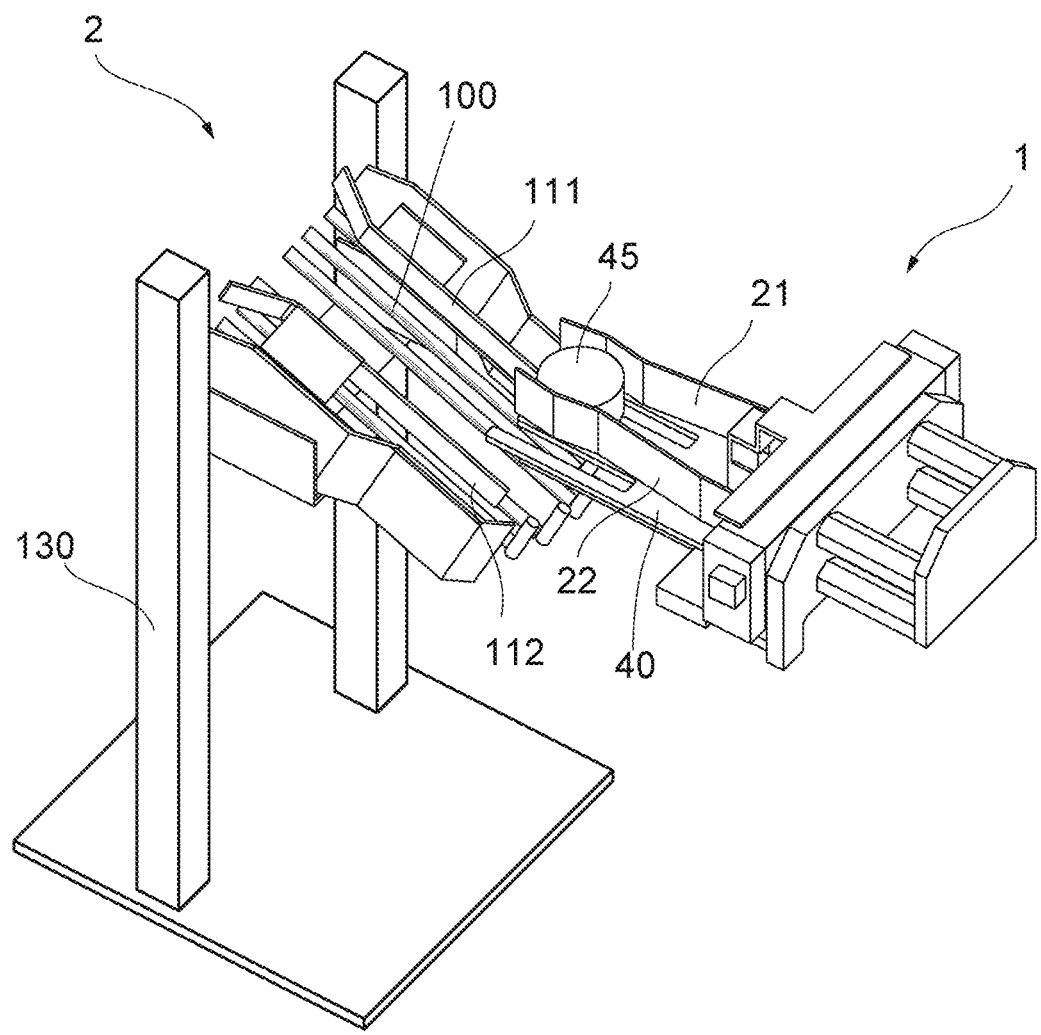
FIG. 11A is a schematic perspective view showing the chute and the gripping device according to the embodiment from above.
Figure 11B:
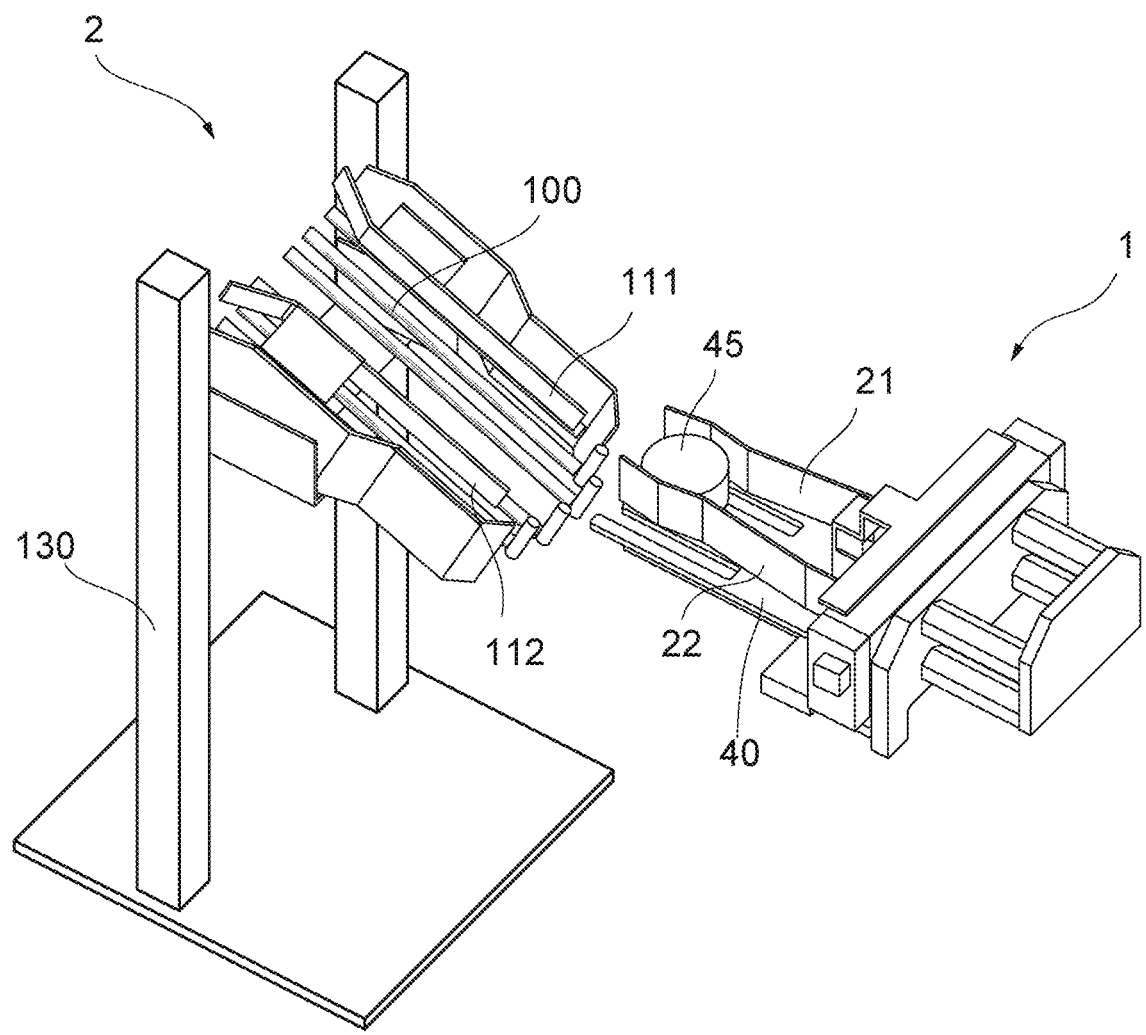
FIG. 11B is a schematic perspective view showing the chute and the gripping device according to the embodiment from above.

As shown in FIG. 11A, after the object to be conveyed 45 is placed on the movable stage 40, the contact member driver 30 of the gripping device 1 sandwiches the object to be conveyed 45 with the first contact member 21 and the second contact member 22 by narrowing the gap between the first contact member 21 and the second contact member 22, and maintains the object to be conveyed 45 on the movable stage 40. Then, as shown in FIG. 11B, the movement device 70 moves the gripping device 1 away from the chute 2, and conveys the gripping device 1 to a conveyance destination of the object to be conveyed 45.

Figure 12A:
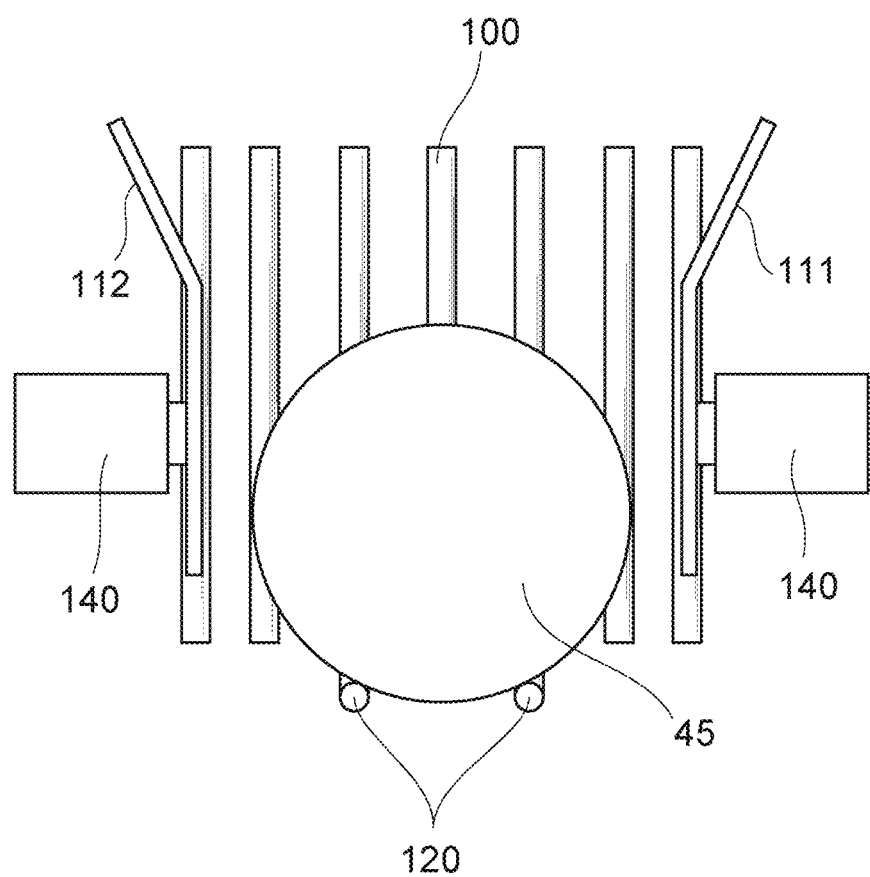
FIG. 12A is a schematic top view showing the chute according to the embodiment from above.
Figure 12B:
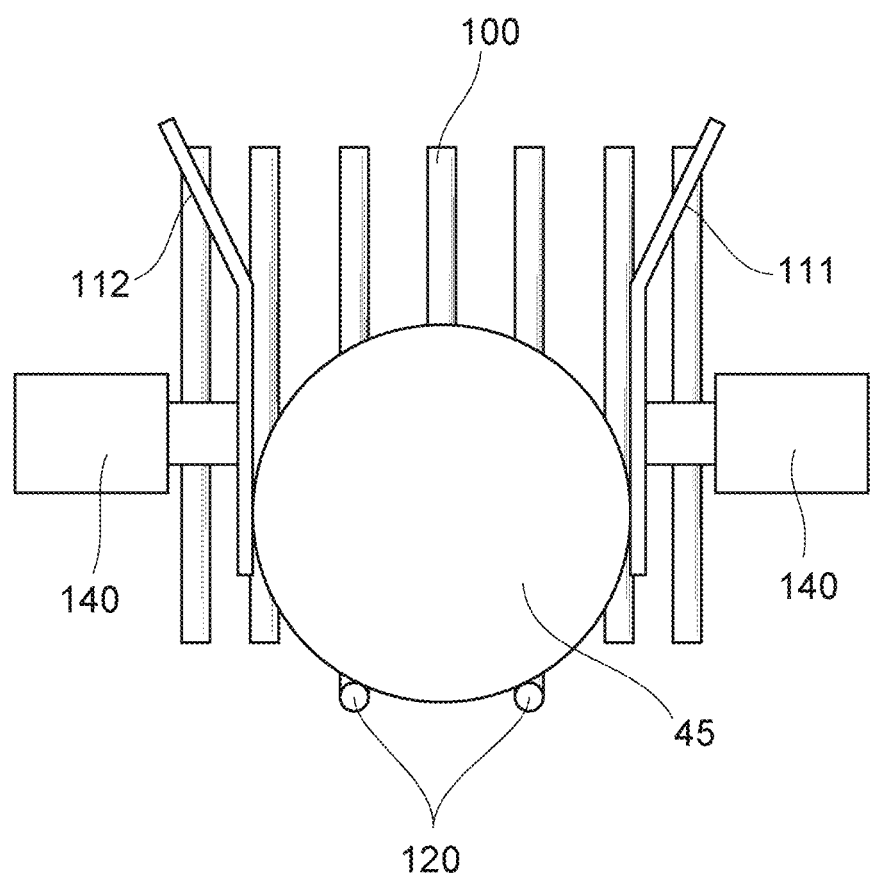
FIG. 12B is a schematic top view showing the chute according to the embodiment from above.

As shown in FIGS. 12A and 12B, the chute 2 may further include a guard driver 140 configured to move at least one of the first guard 111 and the second guard 112 to change a gap between the first guard 111 and the second guard 112. The guard driver 140 may change the gap between the first guard 111 and the second guard 112 depending on a size of the object to be conveyed 45. The guard driver 140 may change the gap between the first guard 111 and the second guard 112 such that a center of the object to be conveyed 45 coincides with a center of a width of the chute stage 100. The guard driver 140 includes an actuator, for example.

As described above, the present invention has been described by way of the embodiment, but statements and drawings forming a part of the disclosure should not be understood to limit the invention. Various alternate embodiments, implementations, and operation technologies will become apparent to those skilled in the art from the disclosure. For example, an example is described where the movable stage drive mechanism 50 includes the elastic body, but the movable stage drive mechanism 50 may include an actuator. As described above, after the object to be conveyed 45 is placed on the upper surface 62 of the conveyance destination stage 60, the movement device 70 causes the gripping device 1 to retract from the conveyance destination stage 60. At this time, the actuator of the movable stage drive mechanism 50 may move the movable stage 40 in an opposite direction from the holder 10. In this manner, it should be understood that the present invention includes various embodiments and the like, which are not described herein.

REFERENCE LIST 1 gripping device
2 chute
10 holder
11 rail
21 first contact member
22 second contact member
23 cover
24 cover
30 contact member driver
40 movable stage
41 recessed portion
42 protruding portion
46 comb-shaped portion
42 tooth portion
43 load presence sensor
44 fitting section
45 object to be conveyed
47 base portion
50 movable stage drive mechanism
60 conveyance destination stage
61 side surface
62 upper surface
70 movement device
100 chute stage
101 protruding portion
102 recessed portion
111 first guard
112 second guard
120 stopper
130 chute stage holder
140 guard driver

The invention claimed is:
1. A gripping device comprising:
a holder;
a first contact member configured to be held by the holder;
a second contact member configured to be held by the holder, the second contact member facing the first contact member;
a contact member driver configured to move at least one of the first contact member and the second contact member to change a gap between the first contact member and the second contact member;

a movable stage configured to be held by the holder, the movable stage being capable of moving below the first contact member and the second contact member; and a movable stage drive mechanism configured to move the movable stage in a direction away from the holder, wherein the movable stage is configured to be slidable below the first contact member and the second contact member, wherein the movable stage drive mechanism is configured to slide the movable stage in the direction away from the holder, and wherein the movable stage drive mechanism includes an elastic body configured to connect the holder and the movable stage, and to store elastic energy when the movable stage moves toward the holder.

2. The gripping device according to claim 1, wherein the holder includes a rail configured to movably hold the movable stage.

3. The gripping device according to claim 1, wherein the gripping device is connected to a movement device configured to cause a distal end of the movable stage to come into contact with a side surface of a conveyance destination stage, to cause the movable stage to move toward the holder, and to cause the first contact member and the second contact member to move to an upper surface of the conveyance destination stage.

4. The gripping device according to claim 1, wherein the movable stage includes a protruding part.

5. The gripping device according to claim 4, wherein the gripping device is connected to a movement device configured to cause the protruding part of the movable stage to pass through a recessed part provided to a conveyance source stage.

6. The gripping device according to claim 1, wherein the contact member driver is configured to move at least one of the first contact member and the second contact member such that the first contact member and the second contact member sandwich an object to be conveyed with a specific force.

7. The gripping device according to claim 1, further comprising a load presence sensor configured to detect an object to be conveyed on the movable stage.

* * * * *